March 22, 1949. W. P. LEAR 2,465,311
COMPASS INDICATION STABILIZING SYSTEM
Filed Oct. 30, 1945 2 Sheets-Sheet 1

INVENTOR
WILLIAM P. LEAR
BY Richard A. Marsa
ATTORNEY

March 22, 1949.  W. P. LEAR  2,465,311
COMPASS INDICATION STABILIZING SYSTEM
Filed Oct. 30, 1945  2 Sheets-Sheet 2

INVENTOR
WILLIAM P. LEAR
BY
Richard A Marsh
ATTORNEY

Patented Mar. 22, 1949

2,465,311

UNITED STATES PATENT OFFICE 2,465,311

COMPASS INDICATION STABILIZING SYSTEM

William P. Lear, North Hollywood, Calif., assignor, by mesne assignments, to Lear, Incorporated, Grand Rapids, Mich., a corporation of Illinois Application October 30, 1945, Serial No. 625,492

12 Claims. (Cl. 33—222)

1

This invention relates to stable directional compass systems, particularly for use aboard aircraft and self-orienting remote indicators actuated thereby. The present application is in part a continuation of my copending application Serial No. 454,559 filed August 12, 1942, now Patent No. 2,403,091, and assigned to the same assignee as the present application.

In modern armored military aircraft, it is desirable to locate the magnetic compass remote from the instrument panel and pilot so as to avoid indication errors due to the surrounding metallic structure. The compass indications are, furthermore, upset during maneuvering and aerobatics of the aircraft that cause temporary spinning and turning errors in the magnetic compass needle indications. The present invention is directed towards a directional compass system wherein the indications are substantially stable during aircraft maneuvers. Towards this end a directional gyroscope is electronically related with the magnetic compass in a manner to stabilize the resultant bearing indications.

In accordance with the present invention, I provide a simple, reliable and effective stabilized directional compass system. The magnetic compass is merely electrically coupled to the system. A standard compass is employed, which may be placed anywhere on the aircraft so as to be relatively unaffected by the metallic structure and armor. Spinning or turning reactions in the magnetic compass are averaged out in the system and do not erroneously affect the resultant indications. The directional gyroscope is inherently "lazy" and stable over short periods of time, and the composite effect with the magnetic compass is to afford stabilized directional indications that have an overall accurate relationship to true north.

An important feature of the present invention is the substantially torqueless pick-off of both the magnetic and gyroscope compass bearings for effecting the orientation control on the gyroscope. In prior systems, errors were introduced in the resultant readings of the system due to the nature and arrangements of the pick-off devices employed. The precessional errors which the directional gyroscope slowly tends to accumulate during flight are continuously and automatically corrected with the magnetic compass as a reference through the intercoupled electronic control unit of the invention. This system is often referred to as a northerly seeking directional gyroscope. Both the magnetic compass and directional gyroscope used are of standard size and of conven-

2 tional design and construction, as are the other components of my system.

Large modern military aircraft generally require a number of remote compass indications throughout the aircraft, so that the copilot, navigator, bombardier, and others thereon may have continuous, direct and stable bearing indications. The compass directional systems of the prior art provided only a limited number of remote indicators. An important aspect of the system of my present invention is the provision of any number of remote compass indicators. These indicators are actuated by locally generated electronic control currents. They are self-aligning, and correspond with the direction of the stabilized directional readings. The remote compass indications are substantially unaffected by gyractions to which the magnetic compass may be temporarily subjected, or precessional errors which the directional gyroscope may tend to accumulate. Thus continuous accurate compass bearings are simultaneously provided throughout the aircraft, without loading or otherwise reflecting errors back onto the compass units.

A further important feature of the present invention is the use of polyphase telemetering "pick-off" units for each of the gyroscope, magnetic compass and remote indicators.

Still another feature of the invention is the provision of a balanced electrical bridge circuit interconnecting the "pick-off" units for the gyroscope and the magnetic compass to control the corrective precessional movement on the gyroscope in accordance with the magnetic compass indications.

These and other advantages, objects and capabilities of my present invention will become more apparent in the following description of a preferred embodiment thereof, shown in the accompanying drawings, in which.

Figure 1:
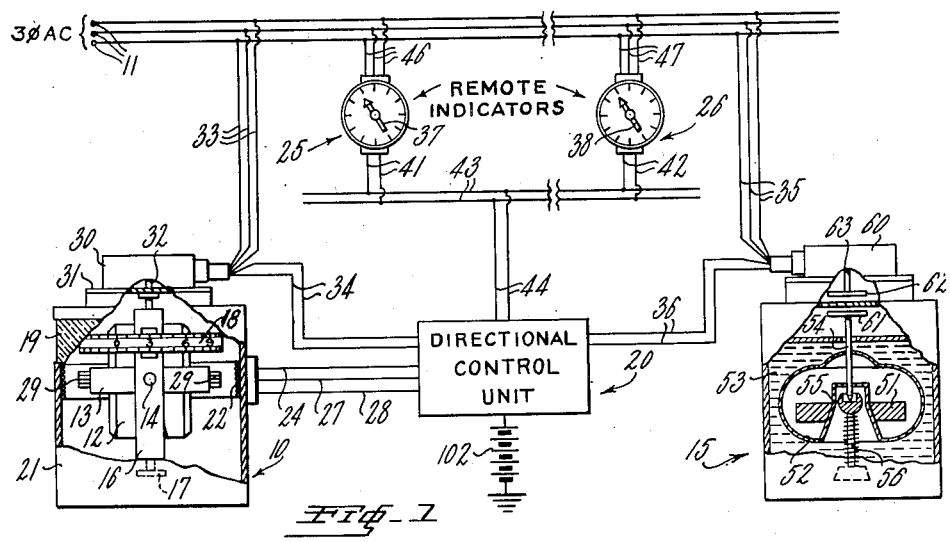
Fig. 1 is a diagrammatic representation of the invention system.

Referring to the drawings, it will be noted that the essential components of the invention system are a directional gyroscope 10, a magnetic compass 15, an intercoupled electronic directional control unit 20, and remote indicators 25 and 26. The system is energized by a local polyphase alternating current source 11 that is generally present aboard an aircraft. A three-phase supply is indicated, although other polyphase systems may be used. In a manner to be described more particularly hereinafter, the directional gyroscope, magnetic compass and remote indicators are each provided with pick-off units, and the stator windings of the pick-off units are energized from the source 11, to which the stator windings of the pick-off units are symmetrically connected electrically. The pick-off unit associated with the directional gyroscope thus corresponds to a transmitter element of a polyphase self-synchronous type of telemetering arrangement. The pick-off units associated with the magnetic compass 15 and the remote indicators 25 and 26 correspond to receiver elements of such self-synchronous type of telemetering arrangement.

Briefly speaking, in the event the rotors of the gyroscope 10 and the magnetic compass 15 are out of their predetermined directional alignment, the pick-off units will be effective to actuate the directional control unit 20 which will effect a precessional corrective movement on the gyroscope rotor to restore the gyroscope compass to its predetermined directional alignment. The remote indicators are coupled to the gyroscope to repeat its readings through the association of the respective pick-off units. The connections of the gyroscope and the compass to their pick-off units are substantially torqueless, so that substantially no torque is exerted on the rotors of the gyroscope or magnetic compass. This assures accurate directional alignment of the gyroscope compass and remote indicators as the corrective action is accomplished with negligible drag or torque which might interfere with accurate directional alignment. As will be apparent as the description proceeds, any number of remote bearing indicators may be incorporated without introducing drag on either the gyroscope 10 or the compass 15.

The directional gyroscope 10 is of the conventional type, comprising a rotor 12 mounted with three degrees of freedom, and which may be electrically or pneumatically driven as will be understood by those skilled in the art. The gyro rotor 12 is spun about a horizontal spinning axis supported in a gimbal ring 13, which in turn is freely mounted on bearings 14 in vertical ring 16. The vertical ring 16 is rotatably supported about a vertical axis on bearings 17 of the gyroscope, and a circular directional scale 18 is supported on the vertical ring 16, and viewed through a window 19 in the gyroscope casing 21.

The gyro indications correspond to the reading of scale 18 opposite the usual index or lubber line marked on window 19. The conventional auxiliary means for driving and caging the gyroscope, not shown, are to be understood as incorporated in the schematically represented directional gyroscope 10. The gyroscope 10 is of standard size and design, being additionally provided with a precession correction winding 22 mounted within the casing 21, and concentric about horizontal gimbal ring 13. The winding 22 is connected to the directional control unit 20 by leads 24, 27 and 28. The control signal introduced into the directional control unit 20 from the pick-off units, in a manner to be described hereinafter, generates a control current at the output of the unit 20 which is selectively applied to the winding 22 through the leads 24, 27 and 28. The unidirectional corrective flux selectively produced in the winding 22 reacts with permanent magnets 29, 29 secured to the horizontal gimbal ring 13. The corrective force thus exerted on the magnets 29 is in a direction so as to counteract any precessional or turning errors that the gyroscope might tend to incur. In this manner, and as will be more apparent hereinafter, the orientation and indication of the gyroscope are made stable, and tied to the true magnetic north indications of the magnetic compass 15.

A bearing "pick-off" unit 30 is supported on a plate 31 that is mounted on top of casing 21. Unit 30 comprises a central vertical shaft 32 which is secured to vertical ring 16 of the gyroscope. Practically no torque or force is imparted to the gyroscope by unit 30, as will hereinafter be set forth in more detail. The directional position of the gyroscope is in this manner directly communicated to unit 20.

Unit 30 corresponds to one component of a polyphase self-synchronous type of telemetering arrangement, and includes a polyphase stator winding energized by the local alternating current source 11 through leads 33. The rotor of unit 30 is connected by leads 34 to directional control unit 20. In a manner to be described, a control signal from unit 30 is combined in unit 20 with a control signal from a corresponding pick-off unit on magnetic compass 15 to produce a unidirectional control current through coil 22. A unidirectional corrective flux is produced by coil 22 that reacts with the permanent magnets 29, 29 secured to horizontal gimbal ring 13. The corrective force thus exerted on magnets 29 is in a direction so as to counteract any precessional or turning errors that the gyroscope may tend to incur. In this manner, the orientation and indications of the gyroscope are made stable, and "tied" to the true magnetic north indications of magnetic compass 15.

The magnetic compass 15 is of standard size and of the conventional design generally used aboard an aircraft. It is a master magnetic compass, containing a substantial magnetic bar 51 which is mounted for free movement in azimuth for alignment with the earth's magnetic field. Bar magnet 51 is within a float 52 which is pivotally supported within a fluid 53 in the housing of the compass 15. A pivot spindle 54 is secured to float 52 and supports the float and magnet bar 51 on a jewel bearing 55. A spring 56 supports bearing 55 and also float 52 in a resilient manner. Magnet bar 51 is thus freely supported for alignment with the earth's magnetic field, fluid 53 serving to damp the movement of the magnet as well as relieve the pivot pressure on bearing 55.

A directional pick-off unit 60 identical in construction with the unit 30, is mounted on the casing of compass 15 and the directional orientations of magnet bar 51 are communicated to the pick-off unit 60, as follows. A small magnet bar 61 is mounted at the upper end of spindle 54 and a second magnet 62 is mounted above magnet 61 and serves as a follow-up or "slave" magnet. Magnet 62 is connected to the rotor of pick-off unit 60 through shaft 63. The azimuthal bearing indications of the main compass bar 51 are thus faithfully communicated to the rotor of pick-off unit 60. Such action is with the application of negligible drag or torque which might interfere with accurate directional alignment of magnet bar 51. The stator windings of the unit 60 are connected to alternating current source 11 symmetrically with the stator windings of unit 30, through leads 35. The rotor of unit 60 is connected by leads 36 to directional control unit 20.

When gyroscope 10 and magnetic compass 15 are in directional alignment, the rotors of units 30 and 60 have a predetermined angular relation within their respective stator windings. Generally, this angular relation is 90°. Under these conditions, no output is produced from unit 20 to energize coil 22.

However, in the event rotor 12 of gyroscope 10 is rotated out of alignment with the magnetic bar 51 of compass 15, the resultant relative displacement from their predetermined angular relation, or "null," of the rotors of units 30 and 60, produce control signals in directional control unit 20. Such control signals effect the aforementioned flow of a unidirectional current through coil 22 to provide a unidirectional magnetic flux acting on magnets 29. The magnitude of the voltage produced across the terminals of coil 22 is substantially proportional to the amount of relative displacement from null of the rotors of units 30 and 60, and the direction of the flux produced in coil 22 is such as to rotate rotor 12 of gyroscope 10 back into its predetermined alignment with magnet bar 51 of compass 15. Desirably, the signals from units 30 and 60 are amplified in unit 20 before being combined to obtain an increased sensitivity of the control action on gyroscope 10.

Remote indicators 25 and 26 each comprise a pick-off unit of the same type as units 30 and 60, with the rotors thereof tied to rotate with indicating needles 37 and 38 of indicators 25 and 26. Leads 41 and 42 connect the rotors of indicators 25, 26 respectively, to a bus 43 interconnected by leads 44 to directional control unit 20. Other leads 46, 47 interconnect the stator windings of the remote indicators to local alternating current source 11, and symmetrically with the stator windings of units 30 and 60. Due to such symmetrical connection, the rotors of the remote indicators tend to retain a predetermined directional alignment with the rotors of units 30 and 60, and will thus follow changes in the directional bearings of gyroscope 10 and magnetic compass 15. Preferably, the remote indicators are tied solely to the gyroscope, which is in turn under the control of magnetic compass 15.

Thus, in practice, the orientation or bearing positions of gyroscope 10 are "tied to" or otherwise made to correspond with the azimuthal bearing positions of compass 15. Both readings are made to refer to true north as the reference, with the magnetic compass finding such north and the gyroscope being made to assume and maintain such spatial reference. The magnetic compass bar 51 naturally assumes such north position, or otherwise averages out its gyrations to effective north position.

Figure 2:
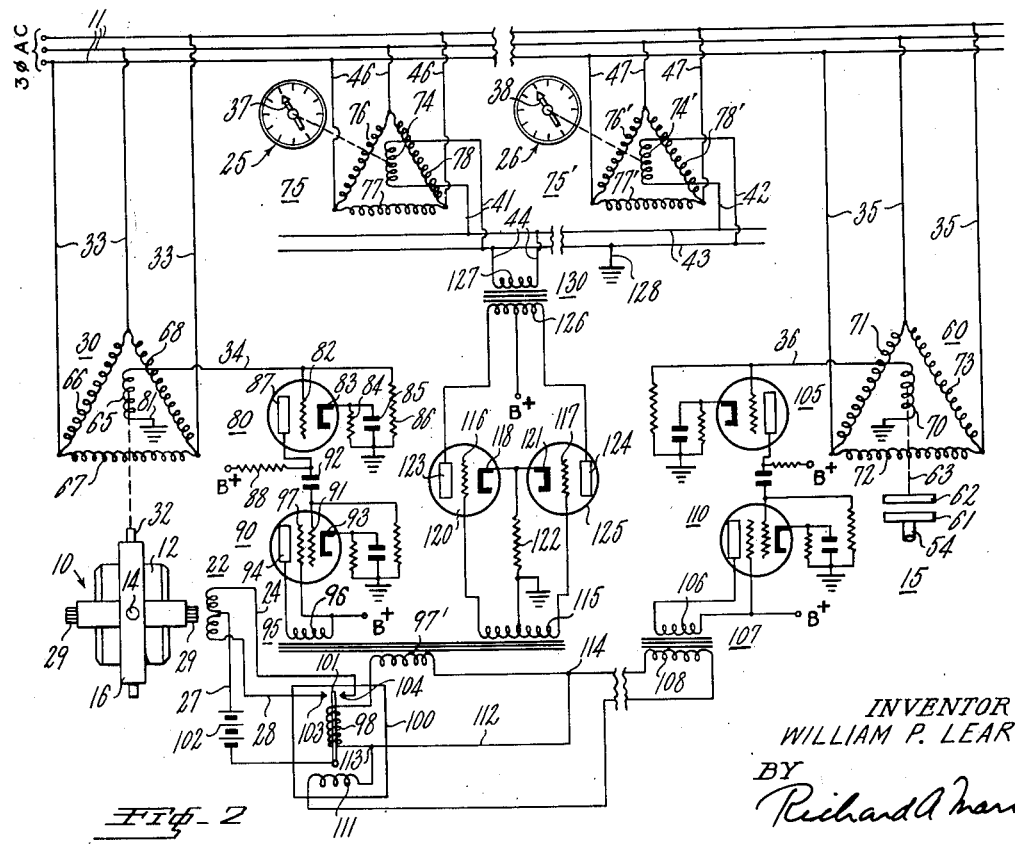
Fig. 2 is a schematic electrical diagram of one embodiment which my invention may assume in practice.

The operation of the system in detail will be understood more clearly by reference to Fig. 2 which is a schematic wiring diagram of one embodiment of the system, including gyroscope 10, magnetic compass 15, remote indicators 25, 26, and associated pick-off units. The pick-off unit 30 associated with gyroscope 10 includes a rotor winding 65 connected to shaft 32 and a three phase stator winding 66, 67, 68 connected by leads 33 to local alternating current source 11. Similarly, pick-off unit 60 associated with magnetic compass 15 includes a rotor winding 70 coupled to shaft 63 and three phase stator windings 71, 72, 73 connected by leads 35 to source 11 symmetrically with the three phase stator windings of unit 30.

The remote indicators 25, 26 comprise pick-off units 75, 75' similar to units 30 and 60 and each includes a rotor winding 74, 74' coupled to pointers 37 or 38. The pick-off units further include three phase stator windings 76, 77, 78 and 76', 77', 78' connected respectively by conductors 46 and 47 to source 11 symmetrically with the stator windings of units 30 and 60.

Due to the symmetrical connection of the stator windings of the several pick-off units to source 11, the polyphase fields of the stator windings will be in the same space and time phase relation, as is well-known in the art. Rotation of each of the rotors within its respective stator will result in the development of an output potential across the terminals of the rotor. However, when the rotor windings are in their predetermined angular or "null" relation with each other within their respective field windings, such output potentials oppose each other and nullify any control action.

In practice, the orientation or bearing positions of gyroscope 10 are "tied to" or otherwise made to correspond with the azimuthal bearing positions of magnetic compass 15. Both readings are thus made to refer to true north as a reference. The magnetic compass 15 finds such north and the gyroscope 10 is made to assume and maintain such spatial reference. The magnetic compass 15 is more sensitive to aerobatic disturbances due to the aircraft, but its northerly indications average out over a period of time. In straight flight, its indications are quite stable. On the other hand, gyroscope 10, having three degrees of freedom is a relatively stable indicator. Its northerly turning or precessional errors are cummulative only over a substantial period of time amounting to at least several minutes. The precessional control action of compass 15 on gyroscope 10 through control unit 20 and coil 22 is made to be only slowly effective, so as not to disturb the normally stable indications of the gyroscope readings by temporary spinnings or upsets of magnetic compass bar 51. It is thus unnecessary to adjust the gyroscope 10 periodically for precessional errors, since such errors are automatically eliminated by reference to and control by the average northerly readings of magnetic compass 15.

One terminal of rotor winding 65 is grounded at 81 and the other terminal thereof is connected through a lead 34 to the control grid 82 of an electronic amplifier tube 80. Cathode 83 of tube 80 is connected to ground through a phasing resistor and condenser combination 84, 85 and a resistance 86 provides the bias for grid 82. The B+ bias for anode 87 of tube 80 is provided through a resistor 88. Anode 87 is capacitance coupled to control grid 91 of a second electronic amplifier tube 90 through a coupling condenser 92. Cathode 93 and control grid 91 of tube 90 are connected in the same fashion as the corresponding elements of tube 80. The B+ potential for anode 94 is provided through a primary winding 96 of a transformer 95, and screen grid 97 is connected to one terminal of winding 96. The amplified potential from rotor winding 65 is thus applied to primary winding 96.

Secondary winding 97' of transformer 95 is connected in electric circuit relation with one coil 98 of a dynamometer relay 100 having a movable contact 101. The pivot point of contact 101 is connected to one terminal of a suitable battery 102 which has its opposite terminal connected to the mid-point of coil 22 by conductor 27. The terminals of coil 22 are connected by conductors 24 and 28 to contact points 103, 104 associated with contact 101. Thus, by engagement of contact 101 with either of its associated contact points, a unidirectional current is provided through one-half or the other of coil 22 to provide a unidirectional flux for magnets 29 in a direction to induce a corrective precessional action on rotor 12 of gyroscope 10.

One terminal of rotor winding 70 of pick-off unit 60 is grounded and the potential from the other terminal thereof is applied through conductor 36 and capacitance coupled electronic amplifier tubes 105, 110 to a primary winding 106 of a transformer 107. The circuit connection of the elements of tubes 105 and 110 are the same as those of tubes 80 and 90, respectively, and specific description thereof is believed unnecessary. The secondary winding 108 of transformer 107 is connected in series with the other operating coil 111 of relay 100. A conductor 112 connects the common junction 113 of coils 98 and 111 to the common junction 114 of secondary windings 97' and 108.

The arrangement thus far described operates in the following manner. When rotor windings 65 and 70 are in their predetermined null relationship, which occurs when gyroscope 10 and magnetic compass 15 are in their predetermined directional alignment, the amplified potentials from rotor windings 65 and 70 are such as to oppose each other, and thus produce no action of relay 100. Should gyroscope 10 move out of such directional alignment with magnetic compass 15, there will be an angular difference from null between the relative positions of rotor windings 65 and 70 within the respective stator windings. The amplified potentials from the rotor windings will therefore no longer be equal in magnitude and opposite in direction.

Accordingly, operation of relay 100 will be effected to swing contact 101 to engage either contact 103 or 104 depending upon the direction of the movement of gyroscope 10 out of directional alignment with magnetic compass 15. The circuit connections are so chosen that the resulting unidirectional current flow through coil 22 is in a direction to produce a unidirectional magnetic flux effecting movement of magnets 29 in a direction to bring gyroscope 10 back into the predetermined directional alignment with magnetic compass 15. At the same time, rotor winding 65 is moved back into its predetermined angular or null relation with rotor winding 70. The amplified potentials from the rotor windings thereupon are substantially equal in magnitude and opposite in direction so that relay 100 becomes de-energized.

The rotors 74, 74' of receiver units 75, 75' connected to remote indicators 25, 26 are tied into predetermined angular relation with the rotor winding 65 of gyroscope pick-off unit 60 in the following manner. A third winding 115 is provided on transformer 95 and its two outer terminals are connected to the control grids 116, 117 of a pair of amplifier tubes 120, 125. Cathodes 118, 121 of the tubes are interconnected to ground and to the center tap of winding 115 through a biasing resistor 122. Anodes 123, 124 are each connected to an outer terminal of a primary winding 126 of a transformer 130. The center tap of winding 126 is connected to B+. Secondary winding 127 of transformer 130 is connected to bus 43, one conductor of which is grounded at 128.

The amplified potential from rotor winding 65 is thus applied to bus 43 to which the potentials from rotor windings 74, 74' are likewise applied. If there is a difference between the two potentials applied to bus 43, as will occur when rotor winding 65 is out of its predetermined directional alignment with rotor windings 74, 74', a torque is impressed on rotor windings 74, 74' in such a direction as to rotate these rotor windings back into their predetermined angular relation with rotor winding 65. At such predetermined angular relation, remote indicators 25, 26 correspond in directional alignment with gyroscope 10. The directional indicators are thus effectively tied to gyroscope 10 which, in turn, is tied to magnetic compass 15.

Figures 3, 4:
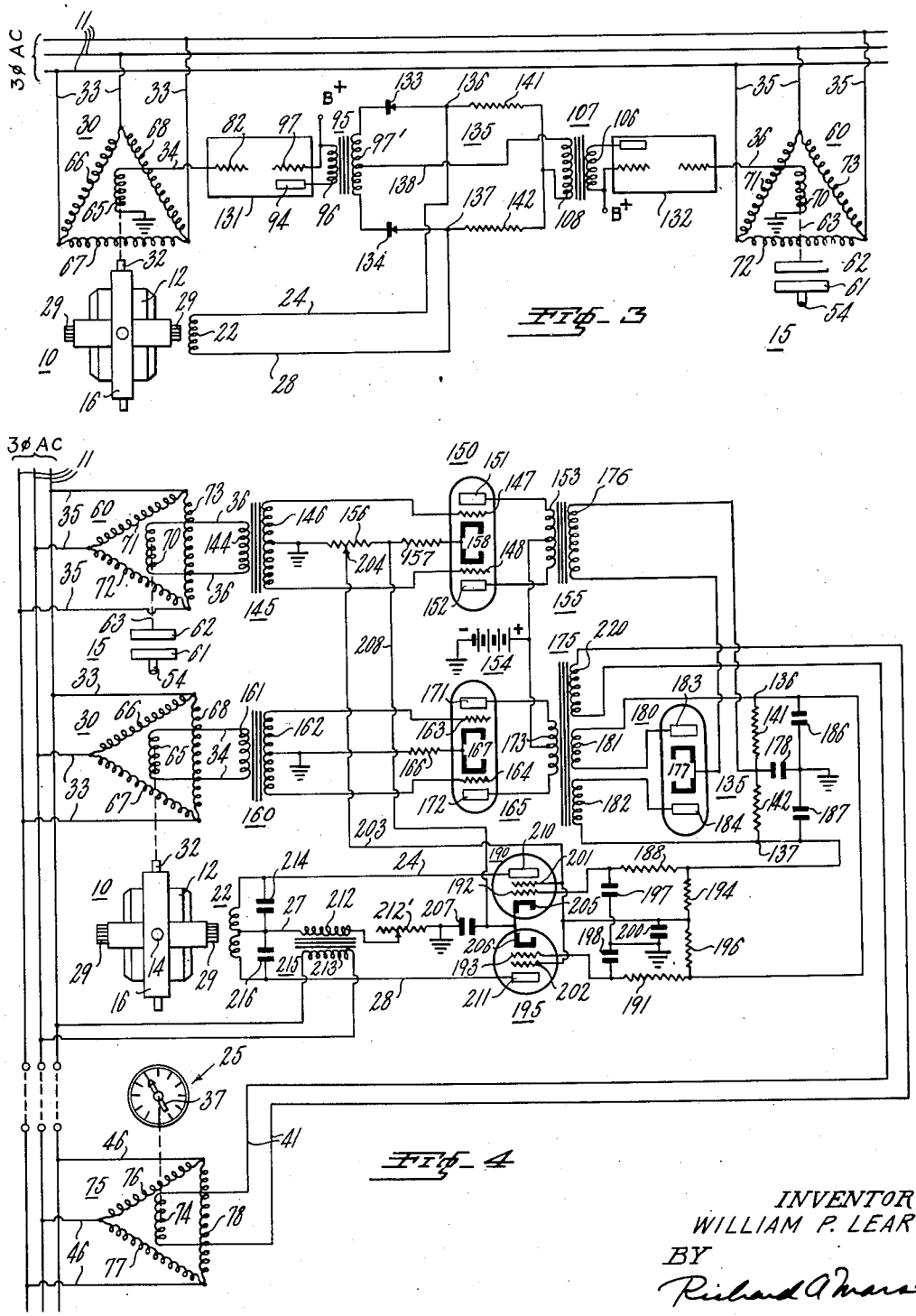
Fig. 3 is a diagrammatic representation of another embodiment of my invention.
Fig. 4 is a schematic electrical diagram of a modified form of the system corresponding to Fig. 3.

Fig. 3 is a diagrammatic representation of a directional control system in which the dynamometer relay 100 of Fig. 2 is replaced by a polarized electrical bridge circuit 135. Elements of Fig. 3 corresponding to the same elements in Fig. 2 have been given the same reference characters. The amplifiers associated with each of coils 65 and 70 have been schematically illustrated in block form at 131 and 132. The outer terminals of winding 97' of transformer 95 are connected through polarizing rectifiers 133, 134 to junction points 136, 137 of electrical bridge circuit 135. Conductors 24, 28 connect precession coil 22 of gyroscope 10 across these junction points. A conductor 138 connects the mid-point of winding 97' to one terminal of winding 108 of transformer 107. The other terminal of winding 108 is connected in parallel through voltage limiting resistors 141, 142 to junction points 136, 137. The values of resistors 141, 142 are so chosen that the effective potential of the full winding 108 at junction points 136, 137 is equal to the potential of one-half of winding 97' at each of these points.

The described arrangement of Fig. 3 operates in the following manner. When rotor windings 65 and 70 are in their predetermined null relation, the output potentials thereof are equal and opposite. Accordingly, the potentials at points 136 and 137 are equal, and there is no potential difference across coil 22. Should there be a displacement from "null" of winding 65 with respect to winding 70, there will be a displacement in phase of the alternating current potential from rotor winding 65 with respect to that from rotor winding 70. Thus, at any particular instant, the potential at the terminals of winding 97' will not be equal in value to the potential applied to junction points 136, 137 from winding 108. As there is a difference in potential between junction points 136 and 137 a unidirectional current will flow through coil 22 effecting a corrective precessional action on the rotor of gyroscope 10 in the manner previously described. The maximum difference in potential at junction points 136 and 137 occurs when windings 65 and 70 have an angular relation of either 0° or 180°. The potential developed by the two rotor windings are equal and opposite at points 136, 137 when the windings are 90° apart with respect to their developed output potentials.

Fig. 4 is a schematic electrical diagram representing a modification of the circuit shown diagrammatically in Fig. 3, and corresponding elements have been given the same reference characters. The output potential of rotor winding 70 is applied through leads 36 to the primary winding 144 of a transformer 145. The terminals of secondary winding 146 of transformer 145 are connected to control grids 147, 148 of a dual amplifier tube 150, whose anodes 151, 152 are connected to the opposite terminals of a primary winding 153 of a transformer 155. The center tap of winding 153 has a direct current positive potential applied thereto from a battery 154. The center terminal of winding 146 is grounded and connected through a potentiometer 156 and a resistor 157 to the dual cathode 158 of tube 150. The negative terminal of battery 154 is likewise grounded. Resistor 157 provides a grid bias for tube 150, and the purpose of potentiometer 156 will be described more fully hereinafter.

The output of rotor winding 65 is impressed through leads 34 upon the primary winding 161 of a transformer 160 having the terminals of its secondary winding 162 connected to the control grids 163, 164 of a dual cathode amplifier tube 165. The center terminal of winding 162 is connected to ground and through a grid bias resistor 166 to the dual cathode 167 of tube 165. Anodes 171, 172 of tube 165 are connected to the opposite terminals of a primary winding 173 of a transformer 175, and the center tap of winding 173 is connected to the positive terminal of battery 154 to apply the B+ voltage to anodes 171, 172. Transformers 155 and 175 correspond, in effect, to transformers 107 and 95 of the arrangements shown in Figs. 2 and 3.

One of the terminals of secondary 176 of transformer 155 is connected to the dual cathode 177 of a dual rectifier tube 180 corresponding to the polarizing rectifiers 133, 134 of Fig. 3. The other terminal of winding 176 is connected to junctions 136, 137 of bridge 135 through resistors 141, 142. The common junction of the resistors is grounded through condenser 178.

The secondary winding of transformer 175, which corresponds to secondary winding 97' of transformer 95, is divided into two sections 181 and 182. The inner terminals of these two sections are connected to anodes 183, 184 of tube 180. The outer terminals of winding sections 181, 182 are connected to junction points 136, 137 of electric bridge circuit 135, which junction points are connected through resistors 141, 142 to one inner terminal of secondary winding 176 in the same manner as diagrammatically illustrated in Fig. 3. Junction points 136, 137 are connected to ground through condensers 186, 187 and through resistors 188, 191 to the control grids 192, 193 of a pair of amplifier tubes 190, 195. A suitable phasing network including resistors 188, 191, resistors 194, 196 and condensers 197, 198 and 200 is provided, with the condensers being commonly connected to ground and condenser 200 being commonly connected to screen grids 201 and 202 of tubes 190 and 195, respectively. A conductor 203 connects the screen grids to the adjustable contact 204 of potentiometer 156, whereby the screen grid bias may be effectively adjusted.

Cathodes 205, 206 are interconnected through condenser 207 to ground and, through a conductor 208, are tied to dual cathode 158 of tube 150. Anodes 210 and 211 are connected through conductors 24, 28 to the outer terminals of winding 22. The center terminal of winding 22 is connected by conductor 27 to one terminal of the secondary winding 212 of a transformer 215, and the other terminal of winding 212 is connected to the adjustable contact of a potentiometer 212' for providing grid bias for tubes 190, 195. Primary winding 213 of transformer 215 is connected across one phase of local alternating current source 11, and condensers 214, 216 are connected across the two halves of winding 22 to by-pass alternating current therefrom so that substantially only the direct current component of the output of tubes 190, 195 passes through coil 22. Conductors 41 connect the rotor winding 74 of unit 75 associated with remote indicator 25 to a third secondary winding 220 of transformer 175.

The described arrangement operates in a manner similar to that of Fig. 3. The resistors 141, 142 reduce the potential, applied from winding 176 to junction points 136, 137 of bridge circuit 135, to substantially balance the potential applied from winding sections 181, 182 to such junction points. When rotor windings 65 and 70 are in null relation, the potentials at each of the junction points are equal in magnitude and opposite in polarity. Thus, under such conditions, no potential is applied to the control grids of tubes 190, 195.

Upon a displacement from null of rotor winding 65, 70, a difference in potential will be developed between junction points 136, 137 applying a corresponding potential to the control grids of tubes 190, 195, activating one tube 190, 195 or the other. Thereby, a unidirectional current is caused to flow through precession coil 22 to effect corrective precessional action on gyroscope 10 in the same manner as previously described. The rate of precession may be adjusted by suitable adjustment of potentiometer 212' which determines the grid bias of tubes 190, 195, and thus the relative potential at which these tubes become conductive to effect a current flow through coil 22. Such precession rate may also be adjusted by suitable adjustment of contact 204 along potentiometer 156 to adjust the screen grid bias of tubes 190, 195. The rotor winding 74 of pick-off unit 75 associated with remote indicator unit 25, is tied to rotor winding 65 in the same manner as previously described.

The described systems of the present invention provide an effective arrangement for tying the indications of gyroscope 10 to those of magnetic compass 15, so that gyroscope 10 becomes a "northerly seeking" gyroscope. Also, any number of remote indicators 25, 26 may be effectively tied to gyroscope 10 to provide indications at numerous points throughout the plane. Such arrangement is possible due to the independent energization of the pick-off units of the remote indicators from local source 11. The invention system not only provides a sensitive operating arrangement but also, due to the amplifiers and the dynamometer relay or bridge circuit arrangements, provides effective operating voltages for application to precession coil 22 to obtain accurate control of the corrective precessional action on gyroscope 10.

While specific embodiments of the invention have been selected for the purpose of illustration, it will be understood by those skilled in the art that the invention may be otherwise embodied without departing from the principles thereof.

What is claimed is:

1. A compass system comprising, in combination, a directional gyroscope; a compass; a first rotor winding coupled to said gyroscope and oriented thereby in correspondence with the directional position thereof; a second rotor winding coupled to said compass and oriented thereby in correspondence with the directional position thereof; a first polyphase stator winding in inductive relation with said first rotor winding; a second polyphase stator winding in inductive relation with said second rotor winding; said stator windings being symmetrically connected to a source of polyphase alternating current and said rotor windings being in electrically null relation when said gyroscope and compass are in a predetermined directional alignment; and means in circuit connection with said rotor windings and operable upon a relative displacement thereof from such null relation, when said gyroscope and compass are out of such predetermined directional alignment, to induce a corrective precessional action on said gyroscope to restore such alignment.

2. A compass system comprising, in combination, a directional gyroscope; a magnetic compass; a first rotor winding coupled to said gyroscope and oriented thereby in correspondence with the directional position thereof; a second rotor winding coupled to said compass oriented thereby in correspondence with the directional position thereof; a first polyphase stator winding in inductive relation with said first rotor winding; a second polyphase stator winding in inductive relation with said second rotor winding; said stator windings being symmetrically connected to a source of polyphase alternating current and said rotor windings being in electrically null relation when said gyroscope and said compass are in a predetermined directional alignment; means for altering the directional orientation of said gyroscope, including a magnet bar secured to the horizontal gimbal ring of the gyroscope and a coil adjacent said ring; and means in circuit connection with said rotor windings and operable upon a relative displacement thereof from such null relation, when said gyroscope and compass are out of such predetermined directional alignment, to induce a corrective precessional action on said gyroscope to restore such alignment, including means connected to said coil for creating a unidirectional flux about said magnet bar.

3. A compass system comprising, in combination, a directional gyroscope; a magnetic compass; a first rotor winding coupled to said gyroscope and oriented thereby in correspondence with the directional position thereof; a second rotor winding coupled to said compass oriented thereby in correspondence with the directional position thereof; a first polyphase stator winding in inductive relation with said first rotor winding; a second polyphase stator winding in inductive relation with said second rotor winding; said stator windings being symmetrically connected to a source of polyphase alternating current and said rotor windings being in electrically null relation when said gyroscope and said compass are in a predetermined directional alignment; and means including a dynamometer relay having its energizing windings in circuit connection with said rotor windings and operable upon a relative displacement thereof from such null relation, when said gyroscope and compass are out of such predetermined directional alignment, to induce a corrective precessional action on said gyroscope to restore such alignment.

4. A compass system comprising, in combination, a directional gyroscope; a magnetic compass; a first rotor winding coupled to said gyroscope and oriented thereby in correspondence with the directional position thereof; a second rotor winding coupled to said compass oriented thereby in correspondence with the directional position thereof; a first polyphase stator winding in inductive relation with said first rotor winding; a second polyphase stator winding in inductive relation with said second rotor winding; said stator windings being symmetrically connected to a source of polyphase alternating current and said rotor windings being in electrically null relation when said gyroscope and said compass are in a predetermined directional alignment; means for altering the directional orientation of said gyroscope, including a magnet bar secured to the horizontal gimbal ring of the gyroscope and a coil adjacent said ring; a dynamometer relay operable to connect said coil to a source of direct current to create a unidirectional flux selectively in either direction about said magnet bar; and means in circuit connection with said rotor windings and operable upon a relative displacement thereof from such null relation, when said gyroscope and compass are out of such predetermined directional alignment, to selectively operate said dynamometer relay to induce a corrective precessional action on said gyroscope to restore such alignment.

5. A compass system comprising, in combination, a directional gyroscope; a magnetic compass; a first rotor winding coupled to said gyroscope and oriented thereby in correspondence with the directional position thereof; a second rotor winding coupled to said compass oriented thereby in correspondence with the directional position thereof; a first polyphase stator winding in inductive relation with said first rotor winding; a second polyphase stator winding in inductive relation with said second rotor winding; said stator windings being symmetrically connected to a source of polyphase alternating current and said rotor windings being in electrically null relation when said gyroscope and said compass are in a predetermined directional alignment; means for altering the directional orientation of said gyroscope, including a magnet bar secured to the horizontal gimbal ring of the gyroscope and a coil adjacent said ring; a dynamometer relay operable to connect said coil to a source of direct current to create a unidirectional flux selectively in either direction about said magnet bar, and including a pair of operating coils; and means, including a pair of electronic amplifiers each connecting one relay coil to one of said rotor windings, and operable upon a relative displacement of said rotor windings from such null relation, when said gyroscope and compass are out of such predetermined directional alignment, to selectively operate said dynamometer relay to induce a corrective precessional action on said gyroscope to restore such alignment.

6. A compass system comprising, in combination, a directional gyroscope; a magnetic compass; a first rotor winding coupled to said gyroscope and oriented thereby in correspondence with the directional position thereof; a second rotor winding coupled to said compass oriented thereby in correspondence with the directional position thereof; a first polyphase stator winding in inductive relation with said first rotor winding; a second polyphase stator winding in inductive relaton with said second rotor winding; said stator windings being symmetrically connected to a source of polyphase alternating current and said rotor windings being in electrically null relation when said gyroscope and said compass are in a predetermined directional alignment; means for altering the directional orientation of said gyroscope, including a magnet bar secured to the horizontal gimbal ring of the gyroscope and a coil adjacent said ring; a dynamometer relay operable to connect said coil to a source of direct current to create a unidirectional flux selectively in either direction about said magnet bar; means in circuit connection with said rotor windings and operable upon a relative displacement thereof from such null relation, when said gyroscope and compass are out of such predetermined directional alignment, to selectively operate said dynamometer relay to induce a corrective precessional action on said gyroscope to restore such alignment; a plurality of remote indicators each including a rotatable index; third rotor windings each mechanically coupled to one of said indices; third polyphase stator windings each in inductive relation with one of said third rotor windings and each connected to the alternating current source symmetrically with said first and second stator windings; said third rotor windings being in electrically null relation with said first rotor winding when said indices are in correspondence with the orientation of said gyroscope and being oriented to such null relation by said third stator windings; and means inductively coupling said first and third rotor windings to effect such correspondence.

7. A compass system comprising, in combination, a directional gyroscope; a magnetic compass; a first rotor winding coupled to said gyroscope and oriented thereby in correspondence with the directional position thereof; a second rotor winding coupled to said compass oriented thereby in correspondence with the directional position thereof; a first polyphase stator winding in inductive relation with said first rotor winding; a second polyphase stator winding in inductive relation with said second rotor winding; said stator windings being symmetrically connected to a source of polyphase alternating current and said rotor windings being in electrically null relation when said gyroscope and said compass are in a predetermined directional alignment; means for altering the directional orientation of said gyroscope, including a magnet bar secured to the horizontal gimbal ring of the gyroscope and a coil adjacent said ring; a dynamometer relay operable to connect said coil to a source of direct current to create a unidirectional flux selectively in either direction about said magnet bar, and including a pair of operating coils; means, including a pair of electronic amplifiers each connecting one relay coil to one of said rotor windings, and operable upon a relative displacement of said rotor windings from such null relation, when said gyroscope and compass are out of such predetermined directional alignment, to selectively operate said dynamometer relay to induce a corrective precessional action on said gyroscope to restore such alignment; a plurality of remote indicators each including a rotatable index; third rotor windings each mechanically coupled to one of said indices; third polyphase stator windings each in inductive relation with one of said third rotor windings and each connected to the alternating current source symmetrically with said first and second stator windings; said third rotor windings being in electrically null relation with said first rotor winding when said indices are in correspondence with the orientation of said gyroscope and being oriented to such null relation by said third stator windings; and means, including an electronic amplifier, inductively coupling said third rotor windings to said first rotor winding to effect such correspondence.

8. A compass system comprising, in combination, a directional gyroscope; a magnetic compass; a first rotor winding coupled to said gyroscope and oriented thereby in correspondence with the directional position thereof; a second rotor winding coupled to said compass oriented thereby in correspondence with the directional position thereof; a first polyphase stator winding in inductive relation with said first rotor winding; a second polyphase stator winding in inductive relation with said second rotor winding; said stator windings being symmetrically connected to a source of polyphase alternating current; circuit means interconnecting said rotor windings to form an electrical bridge, said bridge being balanced when said gyroscope and said compass are in a predetermined directional alignment; and means responsive to signals from said bridge, when said gyroscope and compass are out of such predetermined directional alignment, to induce a corrective precessional action on said gyroscope to restore such alignment.

9. A compass system comprising, in combination, a directional gyroscope; a magnetic compass; a first rotor winding coupled to said gyroscope and oriented thereby in correspondence with the directional position thereof; a second rotor winding coupled to said compass oriented thereby in correspondence with the directional position thereof; a first polyphase stator winding in inductive relation with said first rotor winding; a second polyphase stator winding in inductive relation with said second rotor winding; said stator windings being symmetrically connected to a source of polyphase alternating current; a balanced bridge circuit, two adjacent arms of the bridge each containing a component across which a signal potential derived from said first rotor winding may be impressed, one or the other of said components being energized depending upon the phase of said impressed potential relative to that of the signal derived from the second rotor winding, each said arm including rectifying means, the other two arms of the bridge circuit including impedance elements for balancing the bridge to null when said gyroscope and said compass are in a predetermined directional alignment, the junction of the arms including said input signal components and the junction of the arms including said impedance elements defining one diagonal of the bridge being connected to said second rotor winding and means connected across the other diagonal of said bridge and responsive to signals therefrom, when said gyroscope and compass are out of such predetermined directional alignment, to induce a corrective precessional action on said gyroscope to restore such alignment.

10. A compass system comprising, in combination, a directional gyroscope; a magnetic compass; a first rotor winding coupled to said gyroscope and oriented thereby in correspondence with the directional position thereof; a second rotor winding coupled to said compass oriented thereby in correspondence with the directional position thereof; a first polyphase stator winding in inductive relation with said first rotor winding; a second polyphase stator winding in inductive relation with said second rotor winding; said stator windings beink symmetrically connected to a source of polyphase alternating current; a transformer including a primary winding and a split secondary winding, circuit means connecting said first rotor winding with said primary winding, a balanced bridge circuit, two adjacent arms of the bridge each containing one half of said secondary winding whereby signal potential derived from said first rotor winding, upon displacement thereof from null, is impressed upon said arms in opposed phase relationship, each said arm including rectifying means, the other two arms of the bridge circuit including impedance elements for balancing the bridge to null when said gyroscope and said compass are in a predetermined directional alignment, the junction of the arms including said secondary winding and the junction of the arms including said impedance elements defining one diagonal of the bridge being connected to said second rotor winding; and means connected across the other diagonal of said bridge and responsive to signals therefrom, when said gyroscope and compass are out of such predetermined directional alignment, to induce a corrective precessional action on said gyroscope to restore such alignment.

11. A compass system comprising, in combination, a directional gyroscope; a magnetic compass; a first rotor winding coupled to said gyroscope and oriented thereby in correspondence with the directional position thereof; a second rotor winding coupled to said compass oriented thereby in correspondence with the directional position thereof; a first polyphase stator winding in inductive relation with said first rotor winding; a second polyphase stator winding in inductive relation with said second rotor winding; said stator windings being symmetrically connected to a source of polyphase alternating current; a first transformer; a second transformer including a split secondary winding; a balanced bridge having a first pair of adjacent arms each including impedance means and a second pair of adjacent arms each including one half of said secondary winding and a rectifier in series, the mid-point of said split secondary winding being at one end of the input diagonal of said bridge and connected to one terminal of the secondary of said first transformer, the other end of said input diagonal being connected to the other terminal of the secondary of said first transformer, the other diagonal of said bridge constituting the output terminals thereof; first electronic amplifier means connecting said first rotor winding to the primary winding of said first transformer; second electronic amplifier means connecting said second rotor winding to the primary winding of said second transformer; said bridge being balanced when said gyroscope and said compass are in a predetermined directional alignment; and means connected across said output terminals and responsive to signals therefrom, when said gyroscope and compass are out of such predetermined directional alignment, to induce a corrective precessional action on said gyroscope to restore such alignment.

12. A system as in claim 9 in which said correction-inducing means includes a magnet bar secured to the horizontal gimbal ring of the gyroscope and a coil adjacent said ring, said coil being connected across said other diagonal of the bridge, whereby signals from the bridge create a unidirectional flux in one or the other direction in said bar to induce a corrective precessional action on said gyroscope to restore spatial alignment of the gyroscope and compass.

WILLIAM P. LEAR.

REFERENCES CITED

The following references are of record in the file of this patent:

UNITED STATES PATENTS

| Number | Name | Date |
|---|---|---|
| 2,300,404 | Carter et al. | Nov. 3, 1942 |
| 2,356,186 | Somers | Aug. 22, 1944 |
| 2,403,091 | Lear | July 2, 1946 |

FOREIGN PATENTS

| Number | Country | Date |
|---|---|---|
| 835,470 | France | Sept. 19, 1938 |